Dec. 30, 1969  R. C. VANSTRUM ET AL  3,486,952
METHOD OF MAKING REFLEX-REFLECTOR STRUCTURES
Original Filed Jan. 19, 1962
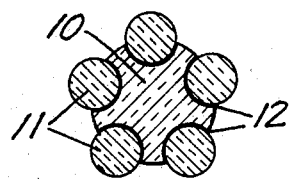
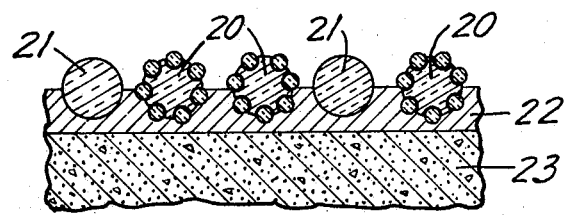
INVENTORS
ROBERT C. VANSTRUM
THOMAS L. HARRINGTON
CHI FANG TUNG
BY Carpenter, Kinney & Coulter
ATTORNEYS 3,486,952
METHOD OF MAKING REFLEX-REFLECTOR STRUCTURES
Robert C. Vanstrum, White Bear Lake, Thomas L. Harrington, St. Paul, and Chi Fang Tung, Lincoln Township, Washington County, Minn., assignors to Minnesota Mining and Manufacturing Company, St. Paul, Minn., a corporation of Delaware
Original application Jan. 19, 1962, Ser. No. 167,272, now Patent No. 3,274,888, dated Sept. 27, 1966. Divided and this application Mar. 7, 1966, Ser. No. 554,230
Int. Cl. G09f 13/16; C03c 15/00
U.S. Cl. 156—3                  4 Claims This application is a division of application Ser. No. 167,272, which was filed on Jan. 19, 1962 and matured into U.S. Patent No. 3,274,888 issued on Sept. 27, 1966.

This invention relates to the art of reflex-reflection and more particularly to a new type of reflex-reflecting aggregate, compositions containing the same, and articles of manufacture containing the same. The invention also relates to a method for making all inorganic weather-resistant reflex-reflecting aggregate.

Durable weather-resistant all-inorganic reflex-reflecting aggregate of the invention may be applied or bonded to surfaces to render the same brilliantly reflex-reflective of incident light regardless of the angle of incidence thereof. Incident light rays at any angle up to about 90° from normal to the surface are brilliantly reflex-reflected. Thus we say that, as a practical matter, we are able to provide sheeting which brilliantly reflex-reflects light striking the same regardless of the angle of incidence of that light.

The aggregate of the invention is also useful in forming traffic markings, as well as other markings. Traffic markings may be formed, for example, by laying down a pigmented paint line and then dropping the aggregate hereof, with or without added beads, on the wet paint, which on drying serves to bond the dropped-on articles in half-embedded position for immediate reflex-reflection. Paint compositions containing beads as known in the prior art may be used to lay down the pigmented paint line (and such compositions may also contain aggregate). Where such is done, advantageous reflex-reflection is achieved by the composite for extremely long periods, since even after the dropped-on aggregate hereof is worn away, beads originally overcoated with pigment of the paint line become exposed and the line continues to serve as a reflex-reflector. In structures formed by dropping on a mixture of beads and aggregate, improved resistance to dislodgment is exhibited by the aggregate over that resistance to dislodgment of aggregate in structures formed by dropping on aggregate alone. Satisfactory results, however, have been gained using aggregate without separate beads on such markings, although the life of such a marking subjected to traffic abrasion is somewhat less than that of a marking formed using a mixture of aggregate plus beads.

All-inorganic reflex-reflecting aggregate is not made without difficulty. It must contain a monolayer of reflex-reflecting complexes consisting of glass microspheres with underlying hemispherical specular metallic reflectors partially embedded in the surface portion of the inorganic central core. Bonding reflex-reflecting complexes to an underlying inorganic central core by an inorganic "ceramic" type of bond involves the use of heat; and this in turn introduces problems of possible diffusion between materials in the structural parts of the complex aggregate structure. Such diffusion, particularly where diffusion of the metallic reflector into the glass of the core or microspheres occurs, destroys effectiveness of the aggregate as a brilliant reflex-reflector. Furthermore, if the expedient of heating core members with discrete reflex-reflecting complexes while tumbling the same in a kiln is used to form the aggregate, it will be found that temperatures sufficient to cause softening of the core members to pick up discrete reflex-reflecting complexes are also temperatures sufficient to cause agglomeration of core members and sticking of the same to kiln walls. Yet, a ceramic-type of bond is necessary in order to gain an all-inorganic type of structure having improved durability and weather-resistance and abrasion-resistance to make it useful for application, for example, upon air strips where it is subjected to the abrasive action of some traffic and of brushes used in cleaning.

By practice of our invention, it is possible to prepare all-inorganic crush-resistant reflex-reflecting aggregate having brilliant reflex-reflective properties; and it is possible to prepare such aggregate in essentially any size range desired, from minute aggregate no greater than about 100 microns average diameter, or even smaller, up to larger sizes on the order of ½ inch average diameter, or larger.

Our invention is described by reference to a drawing, wherein:

FIGURE 1 is a schematic greatly magnified cross-sectional view through a minute all-inorganic reflex-reflecting aggregate particle of the invention; and FIGURE 2 is a fragmentary schematic magnified cross-sectional representation through a painted traffic lane on a highway, the representation serving to illustrate use of reflex-reflecting aggregate of the invention in a surface layer capable of reflex-reflecting incident light striking the same from essentially any angle.

Referring to FIGURE 1, the all-inorganic reflex-reflecting aggregate particles of the invention each consist of an inorganic core 10 with reflex-reflecting complexes consisting of glass microspheres 11 and underlying specular-reflecting metallic hemispherical caps 12 partially embedded in the core with the specular hemispherical caps 12 lying intermediate the glass of the microspheres 11 and the inorganic material of the core 10. In practice, many more reflex-reflecting complexes are usually bonded about a central core than the small number illustrated in the drawing; and they are more closely compacted about the core than illustrated in the drawing. The core 10 may be all glass or may contain an inorganic nucleus coated with a glassy inorganic material satisfying the critical requirements hereinafter described for the glassy core bond. Where a core of different nucleus from the external surface thereof is employed, it is critically necessary that the outer surface layer of the core in the final article contain at least sufficient glassy material to bond partially embedded microspheres 11 therein at about one-half their diameter.

The all-inorganic aggregate particles 20 in the structure of FIGURE 2 are the same as that type illustrated in FIGURE 1. They are schematically illustrated in FIGURE 2 as part of a layer also containing glass beads 21 bonded at about half their diameter by a paint film 22 upon a surface such as a roadway 23.

Free-flowing "drop-on" compositions for forming the structure of FIGURE 2 may contain any desired ratio of aggregate to beads. The refractive index ($n_D$) of the free glass beads in such compositions preferably is about 1.5 or higher, and they preferably should have an average diameter of about 75% that of the aggregate employed up to an average diameter about equal to that of the aggregate.

Forming the aggregate of the invention requires particular attention to the maintenance of certain relationships between the glass material of the core (particularly the outer surface of the core) and the glass material of the microspheres. It is critically necessary that the forming temperatures be insufficient to cause flowage of the glass microspheres and thereby destroy their spheroidal shape.

Generally this means that the softening temperature of the glass for microspheres must be at least about 100° C. above the softening temperature of the binder glass of the core, and preferably at least about 200° C. above the softening temperature for the binder glass of the core. In practice, observing this requirement will ordinarily mean that the softening temperature for the glass of the microspheres should not be lower than about 500° C., and preferably is much higher so as to permit wider selection of the glass material to be used in the core binder function.

While the relationship of the softening temperatures is indeed critical as aforenoted, observing the same alone does not present the entire solution to the problem of making the all-inorganic aggregate. It is further necessary that the glassy materials for the core bond be such as to exhibit a coefficient of thermal expansion, between approximately 50° C. and 300° C., at least approximately equal to the coefficient of expansion of the glass for the microspheres measured in the same temperature range. Preferably the coefficient of thermal expansion for the core bond glass in the noted temperature range should be at least about 5% greater than the coefficient of thermal expansion for the microspheres, and may range up to about 50% greater than the coefficient of thermal expansion for the microspheres. Coefficients of thermal expansion for the glass core bond may be even higher, e.g., about 100% greater than the coefficient of thermal expansion for microspheres, and still provide satisfactory results.

It has surprisingly been found that the use of a core glass having a coefficient of expansion higher than the coefficient of expansion for the microspheres serves advantageously to squeeze or grip the microspheres by a vice-like action in the final all-inorganic reflective aggregate, thus rendering the microspheres highly resistant to dislodgment from the core material. Quite possibly the metallic interlayer between the glass of the microspheres and the glassy material of the core serves as a "cushion" in the structure, taking up some of the strains caused by differences in coefficients of thermal expansion between microspheres and core. However, the difference between the coefficient of expansion of the core and microspheres must not be excessive, since, under such circumstances, the glass of the core material may crack (or the entire structure "pop") during the cooling operation involved in manufacturing the all-inorganic aggregate. Where cores containing internal nuclei are employed, it is necessary to select internal nuclei having a thermal coefficient of expansion which, in combination with the glass binder thereabout, provides a composite which functions as a unit, remaining coherent and essentially non-cracked or "popped" in the final aggregate article.

A further requirement to observe in making the aggregate of the invention is that of using glassy materials which are resistant to weathering action, and which, as an indication of their weather-resistance, as the term is used herein, pass the following chemical test: 10 grams of the glass composition to be tested (in spheroidal form) is immersed in 100 cc. of a water solution containing 10% by weight citric acid for 15 minutes, after which the glass is withdrawn, rinsed, dried and examined under the microscope to determine whether the surface is dulled. If no significant dulling or attack on the glass occurs, it is considered satisfactorily weather-resistant.

It is, of course, also necessary that the glass of both the microspheres and surface portions of the core exposed between microspheres of the aggregate must be such as not to be adversely affected as a result of treatment with a chosen etching solution, where an etching solution is used to remove the outer metallic portion of the specular-reflecting coatings on the microspheres in converting the same into hemispherical caps for the aggregate structure.

In forming the aggregate of the invention, glass cores which preferably are spherical in shape (but may be irregularly shaped), with or without an internal nuclei (of inorganic material such as metal or lithic rock material), are mixed with sufficient organic resin temporary bond material, suitably diluted with volatile solvent for the same, to form an extraordinarily-thin superficially-continuous coating of the organic resin temporary bond material about the core particles. Cores varying in size from a few mils average diameter, usually about 4 mils diameter, up to about 40 mils are preferred; but larger cores approximately ½ inch in diameter may be employed. This step of coating the cores is suitably accomplished by using a steel Muller mixer or other type of mixer capable of spreading an essentially uniformly thin coating of organic resin over each of the particles of core. Best results in terms of a thin uniform coating are therefore obtained when using spherical core members. During mixing, solvent for the organic resin is evaporated so that at the final stages of mixing the resultant product is essentially a free-flowing batch of cores coated with dried non-tacky organic burn-out resin. It is preferred to employ thermosetting types of organic resins which are temporarily heat-tackifiable for this veneer temporary bond coating instead of thermoplastic organic resins. It is vitally important, however, that the temperature during application of the veneer coating be insufficient to effectuate complete cure of thermosetting organic resin bond coatings, since heat-tackification is required in a later step.

Thereafter, the "temporary-bond" coated cores are subsequently treated to pick up a monolayer of metal-coated glass microspheres which ultimately will form the reflex-reflecting complexes of aggregate particles.

The methods as well as the materials employed in forming metal-coated glass microspheres may vary widely. Since the glass microsphere portion of the metal-coated complex is to serve as a lens element in the final structure, it becomes critically necessary to select glass microspheres which will exhibit the necessary index of refraction in the final aggregate particle for the desired end use to which the aggregate particle is put. In other words, where the final aggregate particle is to be used for reflex-reflection of incident light while it is exposed to an air interface about its reflex-reflecting complexes, the refractive index ($n_D$) of the microspheres should be at least 1.7 and no more than about 2.0, with a range of 1.85 to 1.95 being generally preferred. Where other media immediately surrounds the glass microspheres of the reflex-reflecting complexes of the aggregate, glass microspheres of appropriate index of refraction relative to the refractive index of the media are needed; thus, where brilliant reflex-reflection by the aggregate particle is desired when it is submerged, for example, in a film of water, the index of refraction for the microspheres in the granule should preferably be at least about 2.4 up to 2.7, or possibly slightly higher. Thus, in a broad sense, the microspheres employed in the aggregate hereof should exhibit a refractive index of at least 1.7, but may be of varied refractive index above the lower limit up to about 2.7, with preferred results for reflex-reflection under an air interface being obtained at approximately a refractive index of 1.9, and preferred results under a water interface being obtained at approximately a refractive index of 2.5.

The diameter of microspheres for the aggregate may vary also, usually about 15 microns being about the lower limit of size. Microspheres in excess of approximately 200 microns diameter are generally not desired for use inasmuch as their size is so great as to lower the number possible to attach to a central core of given size. By far the most preferred structures are formed using microspheres varying within the range of about 25 to 90 microns in diameter. In all instances the size of microspheres will be smaller than the size of the core employed; but of course, cores and microspheres almost equal in size may be used.

As previously indicated, the softening temperature for the glass of the microspheres should be in excess of the softening temperature for the binder glass of the core. This critical feature is relatively simply satisfied by selecting microspheres of glass composition exhibiting the necessary higher softening temperature from the multitude of high melting glass teachings for reflex-reflecting microspheres heretofore known.

Any suitable heat-resistant metal specular-reflecting coating may be applied over microspheres to provide the metal-coated glass microspherical elements needed for forming the aggregate hereof. Silver metal is very practical to use and therefore preferred. A suitable procedure to form silver-coated microspheres is as follows: Charge 1200 pounds of de-ionized water, with 12 pounds of silver nitrate dissolved therein, into a stainless steel mixing vessel. Add 300 pounds of clean glass microspheres thereto, followed by additions of 25 pounds of a 28% aqueous ammonia solution, 42 pounds of a 23.8% water solution of dextrose and 42 pounds of a 15.8% water solution of potassium hydroxide. Stir the contents and allow the reaction to proceed for about 15 minutes in the mixing vessel. Then filter the silver-coated microspheres from the solution of other ingredients and wash the same before drying them with vibration on a heated plate. Normally 300 pounds of beads of diameter from about 40 to 60 microns may be silvered using quantities of ingredients as here described, but the quantity of microspheres should be lowered when microspheres of smaller average diameter are treated.

Treatment of the "temporary bond" coated cores with metal-coated glass microspheres so as to cause the coated cores to pick up a monolayer of the metal-coated microspheres is suitably accomplished by mixing the coated cores and coated microspheres while heating at least the coating of the cores sufficiently to tackify the organic temporary bond, but insufficiently to soften the glass of the cores or the microspheres. Generally this heating should also be sufficient to effect curing of the organic coating on the cores, when thermosettable organic coatings are employed.

Thereafter, the coated cores with metal-coated microspheres tacked about the surface portion thereof are mixed with heat-resistant inorganic spacing elements and further heated rapidly and momentarily with continued agitation (suitably by tumbling the same through a rotary kiln) to a temperature just sufficient to cause the underlying glass core bond material to soften and draw the metal-coated beads up to about one-half their diameter into the softened glass core, while simultaneously burning off the "temporary bond" organic resin, without causing flowage of the glass of the microspheres. Where thermosetting organic resin temporary bond coats are employed, it appears that improved retention of microspheres on the underlying core is maintained during the step of conversion from a part organic to all inorganic structure. This may be due to the fact that the thermosetting material does not soften and flow out of position during the conversion step. However, the heating step for conversion is accomplished so rapidly that the "safety" factor suggested in connection with using thermosettable materials may not constitute an entire explanation, since burn off of resin occurs simultaneously with wetting and partial embedment of the microspheres in the glass of the core.

Use of a spacing material advantageously improves heat distribution in the process, and helps to avoid the problem of having glass from core elements of the "preform" aggregate flow and stick to walls of the furnace or kiln employed in treatment as well as the problem of having core elements stick to each other during the conversion treatment. In effect, the spacing elements, when very small and/or spherical, act more or less as ball bearings to permit mobility and prevent agglomeration of two or more pre-form aggregate particles during conversion from a part organic structure to an all-inorganic structure. Thus, at least sufficient spacing elements to accomplish this result should be used. As a practical matter, the quantity of spacing elements or "carriers" preferably is at least about equal in bulk or bucket volume to the volume of pre-form aggregate structure subjected to the conversion step, with an excess of spacing elements not particularly disadvantageous to employ in the process. However, a bulk volume of spacing elements in excess of approximately three times the volume of pre-form aggregate particles has not been found to give any great improvement and does in fact create a more burdensome problem of separation after the conversion step is completed.

Some of the spacing elements may be picked up by the softened glass core material during the conversion step; therefore, it is preferable to employ spacing elements or "carriers" which ultimately may be formed into reflex-reflecting complexes for the aggregate particle. By so doing, maximum reflex-reflectivity for the particles is maintained. It is, of course, to be visualized that spacing elements different from microspheres employed in forming the aggregate preform may be employed with satisfactory results, although the resulting article may be somewhat lower in brilliance or reflex-reflectivity than articles formed according to the preferred method involving use of spacing elements of similar character to the coated microspheres employed in making the pre-form aggregate.

Where silver-coated glass microspheres are employed as the spacing elements (and indeed where any metal-coated glass microsphere is so employed), it is best to especially treat the metal surface of the coated microspheres with a refractory "film-forming" powdery material such as, for example, needle-like colloidal alumina (e.g., "Baymal" marketed by E. I. du Pont Company). Such pre-treatment advantageously provides the metal-coated microspheres with a barrier coating, preventing their agglomeration under the heat conditions of the conversion step as well as, particularly in the case of silver coating, essentially preventing the same from wrinkling or other serious deterioration under repeated subjection to the heat conditions of the conversion treatment, thus preserving them should they become part of an aggregate particle and converted into a reflex-reflecting complex. It therefore is critical that the film-like protective coating over a metalized microsphere be such as to not interefere with subsequent etching of metal therefrom. Application of a refractory film-like coating over the surface of the metal-coated spheres does not appreciably interfere with effective bonding of such complexes by the underlying core material where space for an additional metal-coated microsphere is available on that underlying core.

Heating to convert the pre-form aggregate particles from an organic state into an all-inorganic state should be accomplished as rapidly as possible under temperature conditions as accurately controlled as possible so that partial embedment of the metal-coated microspheres up to about 50% of their diameter in the underlying core glass is accomplished without subjecting the composite article to any lengthy exposure to high temperature. Excessively long exposure to high temperatures causes a loss of brightness of light reflection by the composite particle since the materials critcial in its structure tend to interdiffuse or undergo other chemical or physical change under lengthy exposure, causing loss of the critical relationships for brilliantly reflex-reflective all-inorganic aggregate. Of course, some diffusion of metallic coating about microspheres into the underlying binder glass of the core may not be harmful so long as it is not extensive enough to destroy specular reflection through the microspheres. Rapid treatment of the pre-form structure hereof minimizes this problem. For rapid treatment in the conversion step, it is desirable to employ a rotary kiln pre-heated to a temperature well in excess of the temperature to which the aggregate preform particles are to be subjected during conversion, and to pass the aggregate pre-form particles through the kiln with the spacing elements in a rather rapid manner, the rate being adjusted to provide just sufficient heat treatment to cause softening of the underlying core, burn-off of organic binder, and simultaneous embedment of the metal-coated microspheres up to about 50% of their diameter in the core.

All-inorganic granules resulting from the conversion treatment are then allowed to cool (and optionally annealed), excess spacing elements are screened off, and the all-inorganic granules then subjected to an etching treatment to remove the external metal coating of the microspheres into reflex-reflecting complexes having the necessary lens glass and associated underlying specular-reflecting cap for reflex-reflection. Removal of the external metal from the microspheres may, of course, be accomplished in any suitable manner; however, etching has been found to be the most convenient method, particulaly in the case of smaller aggregate particles in the invention, e.g., those below approximately 10 mils average diameter. A suitable etching solution for silver-coated microspheres is formed by adding about 3.4 parts by weight potassium dichromate and 11.5 parts concentrated sulfuric acid to about 405 parts of water. After submersion of the aggregate in the etching solution for about 20 seconds, it is removed and washed with water. Usually several rinsings are employed to be sure to remove residual etching chemical. Thereafter, the aggregate may be dried suitably by heating at about 220° F. for an hour or so.

If desired, the aggregate after being rinsed of etching solution may be further treated with any of several coating materials to achieve results as imparted by the specialized coatings. For example, the aggregate may be treated with a fluorocarbon solution which, after being dried and cured on the surfaces of the aggregate, provides a resulting particle having the ability to float at about one-half its diameter in a thick paint film and thereby avoid being "swallowed up" by the paint film, but nevertheless having the ability to form a strong bond with the paint material so as to resist dislodgment therefrom. Suitable oleophobic and hydrophobic fluorocarbon treatments are disclosed in a copending U.S. patent application assigned to the assignee of this application, said application being S.N. 23,391, filed Apr. 20, 1960, now U.S. Patent No. 3,222,204, by Victor Weber, the disclosure of which is here incorporate by reference. An illustrative fluorocarbon treatment solution is one made from a chromium coordination complex of perfluorooctanoic acid ($C_7F_{15}COOH$) having a chromium to acid mol ratio of 3:1, prepared in isopropanol so as to result in a green-colored solution having a solids concentration of 28%. It is suitably diluted with water to a concentration of about 15% for mixing with the aggregate. After immersion of the aggregate in such solution, excess solution is drained away; and the resulting wet aggregate is dried or cured at about 125° C. for an hour or two to provide the final article having an ultra thin oleophobic coating of characteristics as aforenoted.

Instead of forming aggregate by the method of using an underlying glassy core having at least an external surface portion of glass material satisfying the critical requirements as aforedelineated, it is possible to form all-inorganic aggregate by employing a lithic core material and coating the outer surface thereof with a slip composition of inorganic enamel frit with temporary organic binder admixed therewith. Metal-coated glass microspheres may be temporarily bonded to such external coating and the article converted into an all-inorganic state in essentially the same manner as previously described. Known low-melting inorganic glassy enamel frits (especially those designed for use on aluminum) which also satisfy the other critical requirements for core bond material in the aggregate hereof may be employed in making the aggregate according to this technique.

The following is offered as a specific preferred method of forming the aggregate of this invention.

Glass core members are selected having the following composition:

| | Percent by weight |
|---|---|
| $Na_2O$ | 19.28 |
| $K_2O$ | 10.15 |
| $Li_2O$ | 3.7 |
| $CaO$ | 6.06 |
| $B_2O_2$ | 5.36 |
| $P_2O_5$ | 3.94 |
| $MnO_2$ | 0.26 |
| $TiO_2$ | 17.96 |
| $SiO_2$ | 33.29 |
| | 100.00 |

Glass core spheres having this composition may be made by any well-known techniques. Core spheres passing through a 35 mesh screen and retained on a 60 mesh screen were used to form aggregate. The softening point of the glass of this composition is about 407–430° C. and its thermal coefficient of expansion between 50 and 300° C. is about $16.7 \times 10^{-6}$ cm./cm./°C. It passes the acid weather-resistant test herein recited.

200 pounds of these core beads were placed in a steel Muller mixer with 5 pounds of a resin solution consisting of 50% by weight methyl ethyl ketone solvent, 46.3% room-temperature-solid epoxy resin, and 3.7% isophthalyl dihydrazide curing agent for the epoxy resin. The room-temperature-solid epoxy resin, a reaction product of Bisphenol A and epichlorhydrin, is available as "Epon 1004" from Shell Chemical Corporation. It has a melting temperature, according to Durran's Mercury Method, of about 95°–105° C., an epoxy equivalent of about 875 to 1025, a Gardner Holt viscosity at 25° C. of Q to U (40% solution by weight in butyl carbitol).

The batch in the Muller mixer was mixed for about 15 minutes with air blown into it to evaporate solvent. This mixing provides a free-flowing batch of cores coated with dried resin and curing agent.

Next, silver-coated glass microspheres were mixed with the coated cores. The glass for the micropheres had the following composition: $TiO_2$ 43.5% by weight, $BaO$ 29.3%, $SiO_2$ 14.3%, $Na_2O$ 8.38%, $B_2O_3$ 3.06% and $K_2O$ 1.44%. This glass passes the weather resistance test, starts to soften at about 610° C., has a coefficient of thermal expansion of about $13 \times 10^{-6}$ cm./cm./°C., and a refractive index of about 1.92. The glass microspheres employed had a diameter of about 30 to 70 microns.

As a result of several tests, it has been found that approximately 70 pounds of the silver-coated microspheres here described are picked up or "pre-tacked" upon about 100 pounds of the resin-coated cores of this example; however, it is preferable to mix an excess of the silvered microspheres with the resin-coated cores. Thus, approximately equal parts by bulk volume of resin-coated cores and silvered microspheres (i.e., a weight ratio of cores to microspheres of about 1:2) were mixed together and passed through a rotary kiln set at a temperature of about 260° C. in its hottest zone. The maximum residence time for the mixture of the cores and microspheres in the kiln was about 10 to 12 minutes, and the maximum temperature attained by the mixture was believed to be about 125–150° C. In this step silver-coated microspheres were picked up in a monolayer over the tackified coating on the cores; and the organic resin coating was substantially cured. Excess silvered microspheres were screened off.

Resulting pre-form aggregate was mixed with silvered glass microspheres of the type employed in the pre-tack step, containing also a film-like coating of activated alumina. The mixture was fed through a rotary kiln maintained at a controlled temperature of about 750–900° C. in its hottest zone. Maximum residence of the mixture in this kiln was approximately 3 minutes; and the approximate maximum temperature reached by the mixture was approximately 540–570° C. Approximately equal parts by bulk or bucket volume of the pre-form aggregate and alumina-coated silvered microspheres were mixed together and employed in conducting this step. During this step, the core glass softened and drew the silver-coated microspheres (those pre-tacked about the core as well as a few of those loose ones added) into it up to approximately one-half of their diameter. Simultaneously, the organic resin temporary coating on the cores was burned off leaving essentially no residue or only a fragmentary spotting of carbon, if any. (Incidentally, fragmentary spotting of carbon is infrequent, and has never been noted to seriously impair the reflex-reflecting properties of the final article nor the strength of the bond between microspheres and inorganic core.)

Material emerging from the kiln was screened to remove loose excess alumina-coated silvered microspheres from granules. Then the granules were placed in the etching solution aforedescribed for about one minute to remove external silver from the latent reflex-reflecting complexes and thereby convert them into reflex-reflectors. Following this, the aggregate particles were rinsed with water to remove residual etching compound, and then given a fluorocarbon treatment as aforenoted.

Used as a surfacing ingredient partially embedded in a binder (or without a binder), this aggregate effectively serves as a brilliant reflex-reflector of incident light under dry conditions, regardless of the angle at which the incident light strikes the surface. It is highly resistant to abrasive destruction and has, in practical tests, withstood at least 6 months of weathering in a marker on an airfield, still functioning effectively as a brilliant reflex-reflector of incident light upon it from any angle.

This example, of course, is but illustrative of the invention; and it should be appreciated that various alterations of the specific structure and ingredients of this example are possible as aforenoted without departing from the invention as described herein and claimed in the claims appended thereto.

That which is claimed is:

1. Method of making all-inorganic particles of reflex-reflective aggregate comprising (1) temporarily tacking a discontinuous monolayer of latent reflex-reflecting complexes over the entire surface of discrete underlying inorganic cores with the aid of an organic resinous burn-off material, thereby to form pre-form organic-containing aggregate particles, said latent reflex-reflecting complexes consisting essentially of glass microspheres coated with a specular-reflecting metallic film, and said organic burn-off resinous material being associated with a glassy bond material characterized by having a softening point at least about 100° C. lower than the softening point of the glass of said microspheres and by having a thermal coefficient of expansion at least about equal to, up to about 100% greater than, the thermal coefficient of expansion of the glass of said microspheres, (2) momentarily heating said pre-form particles, while agitating the same in admixture with heat-resistant inorganic spacing elements, just sufficiently to soften the glassy bond material in association with said organic resin and cause said latent reflex-reflecting complexes to be drawn therein up to approximately one-half their diameter, while simultaneously burning off said organic burn-off resin, and (3) etching the metallic film from the portion of said latent reflex-reflecting complexes not embedded in said glassy bond material.

2. Method of making all-inorganic particles of reflex-reflective aggregates comprising (1) coating a thin layer of tackifiable organic resinous burn-off material about underlying inorganic cores, (2) mixing the thus coated cores with latent reflex-reflective complexes under conditions of heat sufficient to cause said complexes to be temporarily tacked by said organic material in a discontinuous monolayer over the entire surface of said coated cores, said latent reflex-reflecting complexes consisting essentially of glass microspheres between about 15 and 200 microns in diameter coated with a specular-reflecting metallic film, said underlying inorganic cores being characterized by having a thickness of glassy bond material, at least on their outer surface portion, equal to about one-half the diameter of said reflex-reflecting complexes, and said glassy bond material of said core being characterized by having a softening point at least 100° C. lower than the softening point of the glass of said microspheres and by having a thermal coefficient of expansion at least about equal to, up to about 100% greater than, the thermal coefficient of expansion of the glass of said microspheres, (3) momentarily heating said pre-form particles, while agitating the same in the presence of heat resistant inorganic spacing elements to a temperature sufficient to soften said glassy bond material and cause said latent reflex-reflecting complexes to be drawn therein up to approximately one-half their diameter, while simultaneously burning off said organic burn-off resin, said temperature being insufficient to cause flowage of the glass microspheres of said reflex-reflecting complexes, and (4) etching the metallic film from the portion of said latent reflex-reflecting complexes not embedded in said glassy bond material.

3. The method of claim 1 in which said latent reflex-reflecting complexes consist essentially of glass microspheres between about 15 and 200 microns in diameter and in which said inorganic cores have a diameter between about 4 mils and one-half inch and a thickness of glassy bond material, at least on their outer surface portion, equal to about one-half the diameter of said latent reflex-reflecting complexes.

4. The method of claim 2 wherein said heat resistant inorganic spacing elements comprise additional latent reflex-reflecting complexes covered with a film-like coating of refractory particles.

References Cited

UNITED STATES PATENTS 3,175,935   3/1965   Vanstrum ------------ 156—3
3,274,888   9/1966   Vanstrum et al. ----- 350—105

JACOB H. STEINBERG, Primary Examiner

U.S. Cl. X.R.

156—13, 24